United States Patent
Bates et al.

(10) Patent No.: US 8,112,414 B2
(45) Date of Patent: Feb. 7, 2012

(54) APPARATUS AND SYSTEM FOR REDUCING LOCKING IN MATERIALIZED QUERY TABLES

(75) Inventors: James P. Bates, Pilesgrove, NJ (US); Jonathan Sloan, Manalapan, NJ (US); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/200,674

(22) Filed: Aug. 28, 2008

(65) Prior Publication Data

US 2010/0057670 A1  Mar. 4, 2010

(51) Int. Cl.
   G06F 7/00 (2006.01)
   G06F 17/30 (2006.01)
(52) U.S. Cl. .................. 707/717; 707/718; 707/719
(58) Field of Classification Search .............. 707/717
   See application file for complete search history.

(56) References Cited

U.S. PATENT DOCUMENTS

| | | | |
|---|---|---|---|
| 6,356,891 B1* | 3/2002 | Agrawal et al. ............... | 1/1 |
| 6,477,525 B1* | 11/2002 | Bello et al. ................... | 1/1 |
| 6,496,819 B1* | 12/2002 | Bello et al. ................... | 1/1 |
| 6,882,993 B1* | 4/2005 | Lawande et al. ............. | 707/714 |
| 7,158,994 B1* | 1/2007 | Smith et al. .................. | 707/717 |
| 7,734,602 B2* | 6/2010 | Folkert et al. ................ | 707/696 |
| 7,783,625 B2* | 8/2010 | Simmen ....................... | 707/713 |
| 7,890,497 B2* | 2/2011 | Folkert et al. ................ | 707/718 |
| 2003/0093407 A1* | 5/2003 | Cochrane et al. ............. | 707/2 |
| 2009/0037489 A1* | 2/2009 | Grundler et al. .............. | 707/201 |

OTHER PUBLICATIONS

Ling et al., "Materialized View Maintenance Using Version Numbers", Digital Library, http://csdl2.computer.org/persagen/DLAbsToc.jsp?resourcePath=/dl/pro . . . , Jan. 31, 2008.

* cited by examiner

*Primary Examiner* — Angela Lie
*Assistant Examiner* — Mark Lee
(74) *Attorney, Agent, or Firm* — Kunzler Needham Massey & Thorpe

(57) ABSTRACT

Disclosed is an apparatus and system for reducing locking in materialized query tables (MQT) for distributive functions. The apparatus includes an insert module that inserts into an MQT table a child record when a new record is inserted into a base table associated with the MQT. The child record includes values associated with the insert operation. Also included is a delete module that inserts into the MQT a child record that includes measure values that are the negative of the measure values in the base table row that is the subject of the delete operation. An update module inserts two child rows into the MQT, one negating the affected record and the other adding the values of the update operation. Each inserted child row includes a unique identifier that relates the inserted row to a parent row. An execution module generates responses using the values indicated by the cumulative records in a family.

3 Claims, 4 Drawing Sheets

Base table 100

| SALES_PERSON | REGION | MONTH | SALES |
|---|---|---|---|
| BATES | ONTARIO | DECEMBER | 1 |
| ZUZARTE | ONTARIO | DECEMBER | 3 |
| ZUZARTE | QUEBEC | DECEMBER | 2 |
| ZUZARTE | MANITOBA | DECEMBER | 2 |
| SLOAN | ONTARIO | DECEMBER | 1 |

New row 110

MQT (Before update)
120

| REGION | MONTH | SALES | SALES_CT |
|---|---|---|---|
| QUEBEC | OCTOBER | 9 | 3 |
| QUEBEC | NOVEMBER | 14 | 3 |
| QUEBEC | DECEMBER | 8 | 3 |
| ONTARIO | NOVEMBER | 6 | 2 |
| ONTARIO | DECEMBER | 4 | 2 |

MQT (After update)
130

| REGION | MONTH | SALES | SALES_CT |
|---|---|---|---|
| QUEBEC | OCTOBER | 9 | 3 |
| QUEBEC | NOVEMBER | 14 | 3 |
| QUEBEC | DECEMBER | 8 | 3 |
| ONTARIO | NOVEMBER | 6 | 2 |
| ONTARIO | DECEMBER | 5 | 3 |

Fig. 1 (Prior Art)

Base table 310

| SALES_PERSON | REGION | MONTH | SALES |
|---|---|---|---|
| BATES | ONTARIO | DECEMBER | 1 |
| ZUZARTE | ONTARIO | DECEMBER | 3 |
| ZUZARTE | QUEBEC | DECEMBER | 2 |
| ZUZARTE | MANITOBA | DECEMBER | 2 |
| SLOAN | ONTARIO | DECEMBER | 1 |

New row 312 ← SLOAN row

MQT 320

| REGION | MONTH | SALES | SALES_CT | SEQ_ID |
|---|---|---|---|---|
| QUEBEC | OCTOBER | 9 | 3 | 0 |
| QUEBEC | NOVEMBER | 14 | 3 | 0 |
| QUEBEC | DECEMBER | 8 | 3 | 0 |
| ONTARIO | NOVEMBER | 6 | 2 | 0 |
| ONTARIO | DECEMBER | 4 | 2 | 0 |
| ONTARIO | DECEMBER | 1 | 1 | 1 |

Parent row 322 ← ONTARIO DECEMBER 4 2 0
Child row 324 ← ONTARIO DECEMBER 1 1 1

Foreign key 326 | Measure values 328 | Unique identifier 330

Fig. 3

MQT 320

| REGION | MONTH | SALES | SALES_CT | SEQ_ID |
|---|---|---|---|---|
| QUEBEC | OCTOBER | 9 | 3 | 0 |
| QUEBEC | NOVEMBER | 14 | 3 | 0 |
| QUEBEC | DECEMBER | 8 | 3 | 0 |
| ONTARIO | NOVEMBER | 6 | 2 | 0 |
| ONTARIO | DECEMBER | 4 | 2 | 0 |
| ONTARIO | DECEMBER | 1 | 1 | 1 |
| ONTARIO | DECEMBER | -1 | -1 | 2 |

Parent row 412 → ONTARIO DECEMBER 1 1 1
Child row 414 → ONTARIO DECEMBER -1 -1 2

Foreign key 326 | Measure values 328 | Unique identifier 330

Fig. 4A

MQT 320

| REGION | MONTH | SALES | SALES_CT | SEQ_ID |
|---|---|---|---|---|
| QUEBEC | OCTOBER | 9 | 3 | 0 |
| QUEBEC | NOVEMBER | 14 | 3 | 0 |
| QUEBEC | DECEMBER | 8 | 3 | 0 |
| ONTARIO | NOVEMBER | 6 | 2 | 0 |
| ONTARIO | DECEMBER | 4 | 2 | 0 |
| ONTARIO | DECEMBER | 1 | 1 | 1 |
| ONTARIO | DECEMBER | -1 | -1 | 2 |
| ONTARIO | DECEMBER | -3 | -1 | 3 |
| ONTARIO | DECEMBER | 5 | 1 | 4 |

Parent row 432
First child row 434
Second child row 436

Foreign key 326 | Measure values 328 | Unique identifier 330

Fig. 4B

APPARATUS AND SYSTEM FOR REDUCING LOCKING IN MATERIALIZED QUERY TABLES

BACKGROUND OF THE INVENTION

1. Field of the Invention

The invention relates to reducing locking events in Materialized Query Tables (MQTs) in a database management system.

2. Description of the Related Art

Unlike snowflakes, not every query received by a database management system (DBMS) is unique. Often, the same query is submitted repeatedly by various database clients. For example, it may be common to query the number of sales for a company in a particular month. In order to save resources, database systems try to minimize the need to execute common queries from scratch every time. IBM's DB2 database management system uses materialized query tables (MQTs) to save computing resources. MQTs contain pre-aggregated pre-joined data. A query optimizer (such as an SQL optimizer) receives a query and recognizes that the query selects from a base table upon which an MQT is defined. If the MQT is responsive to the query, the SQL optimizer uses the MQT information instead of aggregating data from the base table.

For example, FIG. 1 shows a base table 100 and an associated MQT 120. A query may request information on the number of sales and/or the number of sales people in Ontario in December. A sample query statement may specify:

```
SELECT
    REGION,
    MONTH (SALES_DATE),
    SUM (SALES)
FROM
    DB2ADMIN.SALES
GROUP BY
    REGION,
    MONTH(SALES_DATE)
```

The query optimizer recognizes that this data is already pre-aggregated within the MQT 120 and dynamically rewrites the query as follows:

```
SELECT
    REGION,
    MONTH,
    SALES
FROM
    DB2ADMIN.MQT_SALES
```

Thus, using this sort of transformation, the query optimizer can quickly report that for Ontario in December, there were 4 sales. This sales information is retrieved directly from the MQT 120 instead of aggregating this information from the base table 100.

When a new record is inserted into the base table 100 (such as new row 110) the MQT 120 must be updated if it is to continue providing correct values. Currently, if a new row 110 is added to the base table 100, the DBMS locks an associated record in the MQT 120. Thus, when the new row 110 is inserted into the base table 100, the Ontario December row in the MQT 120 is locked. The MQT 120 is then updated to reflect the new value, generating the MQT 130 showing the updated values.

The locking of the MQT 120 can be a severe problem. Every new record inserted into the base table 100 (such as the new row 110) that would generate an update to the MQT record locks the associated MQT 120 record. This lock and release process occurs serially; thus, if twenty new records affect the fifth MQT 120 record (as in the example given above), the DBMS will lock and release the MQT 120 record twenty times as each new record takes its turn updating the MQT 120 record. In short, each base table insert, delete, or update operation has to wait for its turn for the lock in order to update the MQT 120 record.

While locking impacted records in an MQT 120 maintains data accuracy and currency, it also creates a significant bottleneck. This bottleneck is particularly acute where the MQT has a high granularity (that is, a large number of base table 100 rows are summarized in a single MQT row) and where updates occur frequently and quickly. In these situations, locking is more likely and can have serious negative consequences. For example, in a Dynamic Warehouse environment, data enters the base tables while queries are executed against those same base tables. For some database users, this locking problem degrades performance and prevents them from using MQTs beneficially.

SUMMARY OF THE INVENTION

The present invention has been developed in response to the present state of the art, and in particular, in response to the need for MQTs that do not suffer from the locking problems identified above.

This application discloses a computer program product stored on a computer-readable medium for reducing locking events in MQTs. The computer program product includes an MQT definition query that defines the aggregates within the particular MQT as distributive. The product also includes an insert module. The insert module performs an insert operation on the MQT, adding a child row to the MQT in response to an insert operation inserting a base table row in a base table referenced by the MQT. The added child row includes foreign key column values, a unique identifier relating the child row and an existing parent row, and measure values corresponding to insert values of the insert operation in the base table. In one embodiment, the unique identifier is one of a sequential ID number and a time stamp.

The product also includes a delete module. The delete module performs an insert operation on the MQT that adds a child row to the MQT in response to a delete operation deleting a base table row in the base table referenced by the MQT. The added child row includes foreign key column values, a unique identifier that relates the child row and an existing parent row, and measure values having the negative of the measure values of the base table row that is the subject of the delete operation.

The product further includes an update module. The update module adds two child rows to the MQT when an update operation updates a base table row in the base table that is referenced by the MQT. The first added child row includes foreign key column values, a unique identifier relating the child row and an existing parent row, and measure values having the negative of the measure values of the base table row that is the subject of the update operation. The second added child row includes foreign key column values, a unique identifier relating the second added child row and the first added child row, and measure values corresponding to the update values of the update operation in the base table.

In certain embodiments, the product also includes an execution module that provides a value by utilizing the summation of all measure values in the MQT sharing a foreign key. The summation may be executed in an order associated with the unique identifier.

The product may also include a consolidation module that aggregates all records in the MQT having the same foreign key values into a single entry. The aggregation process may occur in response to a determination that there are sufficient CPU cycles available to support the operation without having a negative impact on an associated computing system, a determination that a predetermined time period has passed since a last aggregation, or a determination that the cost of aggregating the MQT is less than the cost of executing a query referencing the MQT without aggregation. Other triggers for consolidation may be implemented in alternative embodiments of the invention.

Also disclosed is a system for reducing the locking of MQTs. The system may include one or more base tables, one or more MQTs based on the base tables, and a database client that submits database queries to the system. The system may additionally include a query optimizer that determines the overhead associated with executing a query against the one or more base tables and the overhead associated with updating one or more MQTs. The system also includes an MQT definition query, an insert module, a delete module, an update module, and an execution module as disclosed above. The system may also include the consolidation module described above. In one embodiment, the system is a DBMS that interacts with the one or more database clients.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 is a diagram illustrating a base table and associated MQT tables utilizing the Immediate Refresh approach;

FIG. 3 is an illustration of a base table and an MQT responding to an insert operation in accordance with the present invention;

FIG. 4A is an illustration of an MQT responding to a delete operation in accordance with the present invention; and FIG. 4B is an illustration of an MQT responding to an update operation in accordance with the present invention.

DETAILED DESCRIPTION OF THE INVENTION

Figure 2:
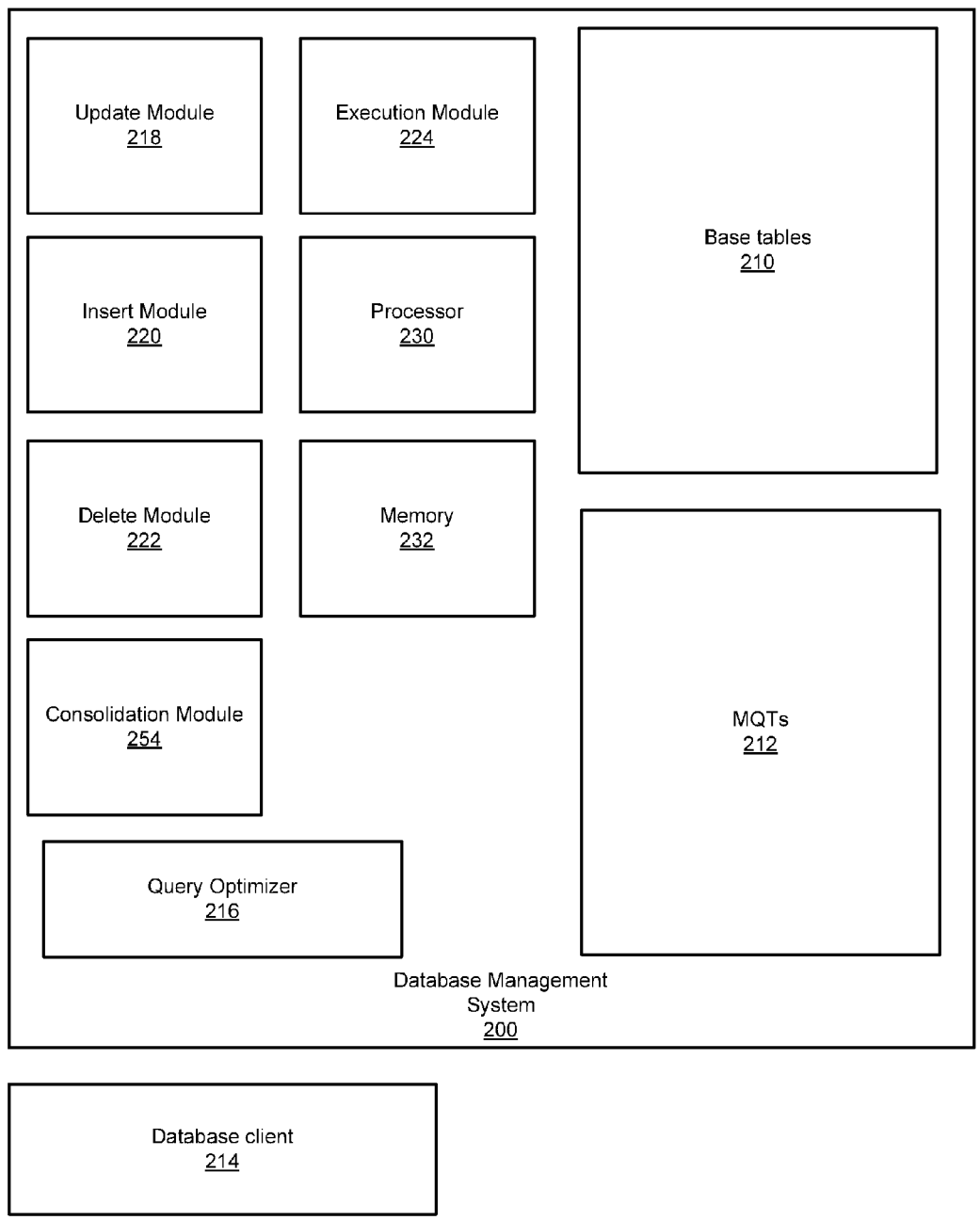
FIG. 2 is a schematic block diagram illustrating one embodiment of system for reducing locking instances in MQTs.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module. Where modules are implemented in software, they may be stored on computer readable media such as hard drives, disks, CDs, flash drives, and other media capable of storing computer readable information that are known to those of skill in the art.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 2 illustrates an exemplary system implementing the present invention. The system includes a database client 214 and a database management system (DBMS) 200. The database client 214 is one of any number of applications that submit database queries to a DBMS 200. The database client 214 may submit the request as part of its pre-programmed operations or in response to a user request. In some embodiments, the request is in the form of an SQL request. While the database client 214 is depicted in FIG. 2 as separate from the DBMS 200, in certain embodiments the database client 214 may comprise part of the DBMS 200 or run on the same hardware as the DBMS 200.

The DBMS 200 includes a processor 230, a memory 232, base tables 210, MQTs 212, and a query optimizer 216. The base tables 210 may comprise any number of tables having a wide variety of data. The MQTs 212 include pre-aggregated, pre-joined data referencing data in one or more of the base tables 210 as discussed in more detail above. Changes to the base tables 210 necessarily affect the data of one or more related MQTs 212.

For the solution proposed in the present invention, the aggregates (also referred to as measures) defined in the MQT definition query must be distributive. A measure is distributive if an aggregate value can be derived from a lower granularity aggregate value that is above the leaf level. For example, a sum operation and a count operation are good examples of distributive measures. A sum at the quarter level of the time dimension can be calculated from an already-computed Month level. As a result, it is not necessary to calculate the Quarter based on the Day level. However, for nondistributive measures such as an average operation, it is always necessary to calculate the Quarter level from the leaf level (such as Day). Non-distributive functions such as averages can only be implemented using a variation on the disclosed method (e.g., using a sum and a count). An MQT definition query specifies whether the aggregates within the MQT 212 are distributive.

The DBMS 200 also includes a query optimizer 216. In certain embodiments, the query optimizer 216 is an SQL optimizer. Those of skill in the art will appreciate that a query optimizer 216 is charged with determining the most efficient way to execute a query based on a number of possible query plans. Thus, the query optimizer 216 determines whether, for a particular request from the database client 214, a relevant MQT 212 exists and translates the original request into one appropriate for the MQT 212. The query optimizer 216 may also determine the cost associated with executing a particular query against the base tables 210 and the cost associated with executing the query against an MQT.

In accordance with the present invention, the DBMS 200 includes an update module 218, an insert module 220, and a delete module 222. These modules correspond respectively to UPDATE, INSERT, and DELETE operations on the base tables 210. The insert module 220 performs an insert operation on an MQT 212 that adds a child row to the MQT 212 when there is an insert operation that inserts a base table row into a base table 210 that is referenced by the MQT 212. The child row includes a foreign key, a unique identifier that relates the child row to a parent row in the MQT 212, and measure values that correspond to the insert values of the insert operation in the base table 210.

FIG. 3 provides an example of a base table 310 in which a new row 312 is inserted. As with FIG. 1, new row 312 inserts a new record into the base table 310 that specifies a new sales person for Ontario in December and further specifies that the individual made one sale. As discussed in connection with FIG. 1, prior to the insert operation, the MQT 320 includes a parent row 322 that specifies the values for Ontario in December prior to the insertion into the base table 310. Rather than lock and refresh, the insert module 220 inserts into the MQT 320 the child row 324 when the new row 312 is inserted into the base table 310. The child row 324 specifies the foreign key values 326 (Ontario December) identical to those of the parent row 322.

In addition, the child row includes a unique identifier value 330 of "1" in the SEQ_ID that distinguishes it from the parent row 322. The unique identifier 330 may be a number (as shown) but may also be a letter, time stamp, or other indicator capable of uniquely identifying the child row 324 when combined with the foreign key values 326. The unique identifier 330 value also specifies the relationship with other members of the MQT 320 sharing the same foreign key 326 values.

The child row 324 also includes measure values 328 corresponding to the insert values of the inserted new row 312 of the base table 310. Thus, in the given example, the SALES_CT value that reflects the number of sales people is given a value of one to represent that "Sloan" has been added as a SALES_PERSON. In addition, the SALES column of the child row 324 is given a value of 1 to reflect the 1 in the SALES column of the new row 312.

As a result, a complete picture can be derived of the current status of the base table 310 without locking the MQT 320 by performing the above-described insert operation. By considering all records in the MQT 320 with the relevant Ontario-December foreign key, a complete and accurate picture can be derived without imposing a lock. For example, summing the values of SALES and SALES_CT provides the same result as in FIG. 1, but without the lock effect of the approach of FIG. 1.

In one embodiment, the insert module 220 constructs a skeleton INSERT statement for the MQT 212 and generates the foreign key values (which are non-measure values) for the row. The insert module 220 can do this using the same approach used in an MQT UPDATE process initiated as part of the immediate refresh procedure described in connection with FIG. 1. The insert module 220 then applies the measure values of the INSERT statement directed at the base table 210 to each appropriate column in order to reflect the change to the base table 210 in the MQT 212. The insert module 220 then auto-increments the unique identifier column (such as SEQ_ID) and applies this new INSERT statement to the MQT 212.

Returning to FIG. 2, the DBMS 200 also includes a delete module 222. The delete module 222 performs an insert operation on the MQT 212 that adds a child row to the MQT 212 when a delete operation is performed on a base table 210 that is referenced by the MQT 212. This added child row includes the foreign key column values, a unique identifier that relates the child row to an existing parent row of the MQT 212, and measure values that have the negative of the measure values in the affected row of the base table 210.

FIG. 4A continues the example of FIG. 3 and adds to it an exemplary embodiment of the MQT 320 following a delete operation on the base table 310. In the example shown, the delete operation removes the new row 312 for SALES_PERSON Sloan. In response, the delete module 222 adds the child row 414 to the MQT 320. The unique identifier 330 value for SEQ_ID is incremented to 2. Thus, the child row 414 is a child of the parent row 412. As described above in connection with FIG. 3, the parent row 412 is itself a child row of the parent row 322 shown in FIG. 3.

Again, rather than lock and refresh, the delete module 222 causes the child row 414 to be inserted into the MQT 320 with the foreign key 326 values of ONTARIO-DECEMEBER. In addition, the measure values 328 are −1 for SALES (thus negating the 1 sale reported for Sloan) and a −1 for SALES_CT to appropriately reduce the of sales people reported after the Sloan record is removed from the base table 320 by the delete operation. Thus, the measure values 328 for the child row 414 are the negative of the measure values of the base table row (here, new row 312) that is the subject of the delete operation on the base table 310. When the MQT 320 records for DECEMBER-ONTARIO are considered as a whole, the removal of the Sloan record from the base table 310 is properly reflected.

In one embodiment, the delete module 222 constructs a skeleton INSERT statement for the MQT 320 and generates the foreign key 326 columns for the child row 414 using the same approach used in an MQT UPDATE process initiated as part of the immediate refresh procedure described in connection with FIG. 1. The delete module 222 then reads the record to be deleted from the base table 310 and captures the measure values from that record. The delete module 222 then applies the negative of those measure values to the INSERT statement for the MQT 320. The delete module 222 also increments the unique identifier 330 and applies the new INSERT statement (such as child row 414) to the MQT 320.

Returning again to FIG. 2, the DBMS 200 also includes an update module 218. The update module 218 alters the MQTs 212 in response to update operations on a base table 210. The update module 218 negates the current base table value for the particular row affected by the update operation and then inserts the new modified values into the MQT 212. The update module 218 does so by adding two child rows to the MQT 212 when an update operation is performed on a base table row in the base table 210 referenced by the MQT 212.

The first added child row includes the foreign key column values, a unique identifier that relates the first added child row to an existing parent row, and measure values that have the negative of the measure values of the base table row that is the subject of the update operation. This effectively removes the values from the MQT 212 as if the particular record had been removed from the base table 210 instead of being updated. In one embodiment, the update module 218 uses the delete module 222 to add the first added child row to the MQT 212.

The second added child row includes the foreign key values, the unique identifier relating the second added child row to the first added child row, and measure values corresponding to the updated values of the update operation on the base table 210. In one embodiment, the update module 218 uses the insert module 220 to add the second added child row to the MQT 212.

FIG. 4B continues the MQT 320 example, and shows the effect of updating the record for SALES_PERSON Zuzarte shown in base table 310. As shown in FIG. 3, the base table 310 shows that Zuzarte had 3 sales for December in Ontario. In this particular example, a client (such as the database client 214) recognizes that this was either an error or incomplete, and updates the base table 310 using an update operation to reflect that Zuzarte actually made 5 sales for December in Ontario.

In response to the update operation on the base table 310, the update module 218 inserts a first child row 434 into the MQT 320. This first child row is related to the parent row 432 by the unique identifier 330; here, the SEQ_ID value is incremented to specify a value of "3", which follows sequentially from the parent row 432 SEQ_ID value of "2." The first child row 434 includes the foreign key 326 values of Ontario and December, and negates the values of the base table 310 row that is subject to the update operation. Thus, the 3 sales reflected in the Zuzarte record are negated by providing a −3 value, and the existence of Zuzarte is negated through the insertion of a −1 value in SALES_CT.

The update module 218 further inserts a second child row 436 to reflect the update values for the Zuzarte record. Again, the foreign key 326 values are specified, and the unique identifier 330 value is incremented. In addition, the measure values 328 are adjusted to reflect the update values of the update operation on the base table 310. Thus, the measure values 328 show the 5 sales Zuzarte made, and the SALES_CT is increased to 1 to reflect the addition of the Zuzarte record. In an alternative embodiment, the update module 218 may look for measure values that are subject to change and not adjust those values that are not affected by the update operation.

The DBMS 200 also includes an execution module 224 that provides to a database client 214, as a response to a query on the base tables 210 answerable by a distributive MQT 212 implementing the present invention, a value utilizing the summation of all measure values in the MQT 212 sharing a foreign key. In one embodiment, this summation is executed in an order associated with the unique identifier.

For example, a database client 214 submitting a query requiring information concerning the sales for Ontario in December to the query optimizer 216 in the DBMS 200 receives an answer directed by the execution module 224. The execution module 224 examines the MQT 320 as shown in FIG. 4B. Based on the data in MQT 320, the execution module 224 would report for sales: 4+1+−1+−3+5=6; a sales count: 2+1+−1+−1+1=2. Those of skill in the art will appreciate that this response is the response that would have been received if the immediate refresh approach described in connection with FIG. 1 were used. However, in accordance with the present invention and in contrast to FIG. 1, the present response is given without locking the MQT records.

For example, a database client 214 may submit a query referencing a distributive MQT 212 implementing the present invention. The query may be in the form:

```
SELECT
    REGION,
    MONTH(SALES_DATE),
    SUM(SALES)
FROM
    DB2ADMIN.SALES
GROUPBY
    REGION,
    MONTH(SALES_DATE)
```

The execution module 224 would dynamically rewrite this query as follows:

```
SELECT
    REGION,
    MONTH,
    SUM(SALES)
FROM
    DB2ADMIN.MQT_SALES
GROUPBY
    REGION,
    MONTH
```

Those of skill in the art will appreciate that the unique identifier 330 is ignored when rewriting the select against the base table 310 to a select statement against the MQT 320. In addition, the aggregate function used in the base query submitted by the database client 214 is retained in the query as rewritten by the execution module 224. Thus, the present solution introduces some additional data management responsibilities to the DBMS 200 in order to prevent locking.

The DBMS 200 also includes a consolidation module 254 that aggregates all records in the MQTs 212 having the same foreign key values (not including the unique identifier 330 value) into a single entry. In one embodiment, the aggregation operation is triggered by a determination that there are sufficient CPU cycles available in the DBMS 200 to support the aggregation operation without imposing a negative impact on the DMBS 200 functionality. For example, the consolidation module 254 may determine that the DBMS 200 can both aggregate and respond to requests from one or more database clients 214. The consolidation module 254 may, however, determine that given the volume of requests and other operations consuming computing resources of the DBMS 200, the aggregation operation will have to wait.

In another embodiment, the consolidation module 254 bases the aggregation operation on time periods. For example, the consolidation module 254 may determine that a predetermined time period has passed since the last aggregation. In another embodiment, the consolidation module 254 may trigger aggregation at a time (such as midnight or on weekends) when historically the DBMS 200 is less busy with requests.

In another embodiment, the consolidation module 254 may use the query optimizer 216 to help determine the cost of aggregating the MQT 212 and the cost of executing a query against the MQT 212 without aggregation. Those of skill in the art will appreciate that the present invention does impose some computational cost on the DBMS 200. The consolidation module 254 can trigger aggregation when the query optimizer 216 determines that the cost of doing so is more efficient than executing the query against the MQT 212 without aggregation.

Those of skill in the art will appreciate that a variety of triggers may be used to indicate when the consolidation module 254 ought to aggregate the information in the records of the MQT 212. The consolidation operation ensures efficient performance and disk utilization. The consolidation module 254 consolidates newly inserted records into the master (or ancestor) record. In one embodiment, the newly inserted records are consolidated into the record having the earliest unique identifier 330 value.

Returning to the example of FIG. 4B, the consolidation module 254 determines which rows have the foreign key 326 values of Ontario and December. All records having this value are subject to the aggregation operation. In the given example, the row with the value foreign key 326 values of Ontario and December and the unique identifier 330 value of 0 has its measure values replaced with the appropriate aggregate values; in this case, 6 for SALES and 2 for SALES_CT. The remaining rows with the Ontario and December foreign key 326 values are removed from the MQT 320.

In one embodiment, the consolidation module 254 performs this operation by identifying records with a non-zero unique identifier 330 value and merging them with their parent row by applying the appropriate aggregate function to each measure value 328 column. The aggregate function to be applied is determined by the SQL statement that defined the MQT.

For example, the consolidation module 254 may examine the SQL statement that defined the MQT and construct an UPDATE template that includes each foreign key column and each aggregate function for each measure column. The foreign key column value is found in the GROUP BY clause. The consolidation module 254 then scans the MQT 320 for each row with a non-zero unique identifier 330 and appends a predicate to the UPDATE template with values from the foreign key columns in the found row. The consolidation module 254 then executes the UPDATE statement which consolidates all matching rows with their parent row. The consolidation module 254 then executes a DELETE on rows where the foreign key is equal to the found row and the unique identifier 330 is not 0.

Thus, at the end of the process, a single record with the foreign key value exists, and this record has a unique identifier 330 value of 0. The remaining records are then removed from the MQT 320. Those of skill in the art will appreciate that the example of the unique identifier 330 being an integer is simply an example, and that the present invention could also be implemented using a time stamp approach or other unique identifier 330 value type. Those of skill in the art will further appreciate how the process described above could be altered for a particular unique identifier 330 type.

MQTs 212 having the additional unique identifier 330 required by the present invention can be implemented using approaches similar to those currently in use. In one embodiment, the unique identifier 330 is hidden from end users since it is unlikely to be used or accessed directly. The process of generating the MQTs, in one embodiment, includes identifying for each aggregate function in the MQT DDL whether or not the aggregate function is distributive. For those MQTs with distributive aggregate functions, new columns are added to the MQT DDL for a unique identifier 330 such as SEQ_ID. The default value may be set to zero and marked as non-nullable. The SEQ_ID may further be included in any indexes on the foreign keys of the MQT. After creation, these new MQTs 212 can be populated normally when the SEQ_ID column is given a default.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a computer-readable medium for reducing the locking of Materialized Query Tables (MQTs), the computer program product comprising:
   a MQT definition query defining the aggregates within a MQT as distributive;
   an insert module configured to perform an insert operation on the MQT that adds a child row to a MQT without refreshing the MQT in response to an insert operation inserting a base table row in a base table referenced by the MQT,
      wherein the added child row comprises:
         one or more foreign key column values;
         a unique identifier relating the child row and an existing parent row; and
         one or more measure values corresponding to one or more insert values of the insert operation in the base table; and
   a delete module configured to perform an insert operation on the MQT that adds a child row to the MQT without refreshing the MQT in response to a delete operation deleting a base table row in the base table referenced by the MQT, wherein the added child row comprises:
      one or more foreign key column values;
      a unique identifier relating the child row and an existing parent row; and
      one or more measure values having the negative of the measure values of the base table row that is the subject of the delete operation;
   an update module configured to add two child rows to the MQT without refreshing the MQT in response to an update operation updating a base table row in the base table referenced by the MQT with one or more new values:
  wherein the first added child row comprises:
    one or more foreign key column values;
    a unique identifier relating the child row and an existing parent row; and
    one or more measure values having the negative of the measure values of the base table row that is the subject of the update operation; and
  wherein the second added child row comprises:
    one or more foreign key column values;
    a unique identifier relating the second added child row and the first added child row; and
    one or more measure values corresponding to one or more update values of the update operation in the base table;
an execution module configured to provide a value in response to a query requesting values associated with a particular foreign key by summing all measure values in the MQT sharing the particular foreign key, wherein the summation is executed in an order specified by the unique identifier; and
a consolidation module that executes an aggregation operation that aggregates all records in the MQT having the same foreign key into a single row entry without refreshing the MQT from the base table, wherein the consolidation module is further configured to determine:
  that there are sufficient CPU cycles available to execute the aggregation operation without negatively impacting an associated computing system, and wherein the consolidation module initiates aggregation in response to determining that there are sufficient CPU cycles;
  that a predetermined time period has passed since a last aggregation operation, and wherein the consolidation module initiates aggregation in response to determining that the predetermined time period has passed; and
  that a cost of aggregating the MQT is less than a cost of executing a query referencing the MQT without aggregation, and wherein the consolidation module initiates aggregation in response to determining that the cost of aggregating the MQT is less than a cost of executing the query referencing the MQT without aggregation.

2. The computer program product of claim 1, wherein unique identifier relating the child row and an existing parent row is one of a sequential ID number and a time stamp.

3. A system for reducing the locking of Materialized Query Tables (MQTs), the system comprising:
  one or more base tables;
  one or more MQTs based on the one or more base tables;
  a database client that submits one or more database queries;
  a query optimizer that determines the overhead associated with executing a query against the one or more base tables and the overhead associated with updating one or more MQTs;
  a MQT definition query defining the aggregates within one or more of the MQTs as distributive;
  an insert module configured to perform an insert operation on the distributive MQT that adds a child row to the distributive MQT without refreshing the MQT in response to an insert operation inserting a base table row in a base table referenced by the distributive MQT, wherein the added child row comprises:
    one or more foreign key column values;
    a unique identifier relating the child row and an existing parent row; and
    one or more measure values corresponding to one or more insert values of the insert operation in the base table; and
  a delete module configured to perform an insert operation on the distributive MQT that adds a child row to the distributive MQT without refreshing the MQT in response to a delete operation deleting a base table row in the base table referenced by the distributive MQT, wherein the added child row comprises:
    one or more foreign key column values;
    a unique identifier relating the child row and an existing parent row; and
    one or more measure values having the negative of the measure values of the base table row that is the subject of the delete operation; and
  an update module configured to add two child rows to the distributive MQT without refreshing the MQT in response to an update operation updating a base table row in the base table referenced by the distributive MQT with one or more new values:
    wherein the first added child row comprises:
      one or more foreign key column values;
      a unique identifier relating the child row and an existing parent row; and
      one or more measure values having the negative of the measure values of the base table row that is the subject of the update operation; and
    wherein the second added child row comprises:
      one or more foreign key column values;
      a unique identifier relating the second added child row and the first added child row; and
      one or more measure values corresponding to one or more update values of the update operation in the base table; and
  an execution module configured to provide a value in response to a query requesting values associated with a particular foreign key by summing all measure values in the MQT sharing the particular foreign key, wherein the summation is executed in an order specified by the unique identifier; and
  a consolidation module that executes an aggregation operation that aggregates all records in the MQT having the same foreign key into a single row entry without refreshing the MQT from the base table, wherein the consolidation module is further configured to determine:
    that there are sufficient CPU cycles available to execute the aggregation operation without negatively impacting an associated computing system, and wherein the consolidation module initiates aggregation in response to determining that there are sufficient CPU cycles;
    that a predetermined time period has passed since a last aggregation operation, and wherein the consolidation module initiates aggregation in response to determining that the predetermined time period has passed; and
    that a cost of aggregating the MQT is less than a cost of executing a query referencing the MQT without aggregation, and wherein the consolidation module initiates aggregation in response to determining that the cost of aggregating the MQT is less than a cost of executing the query referencing the MQT without aggregation.

* * * * *